United States Patent [19]

Hahn et al.

[11] 4,240,609
[45] Dec. 23, 1980

[54] FLOW CONTROL APPARATUS

[75] Inventors: Guerry L. Hahn; Gerald S. Baker, both of Houston, Tex.

[73] Assignee: Cameron Iron Works, Inc., Houston, Tex.

[21] Appl. No.: 931,462

[22] Filed: Aug. 7, 1978

[51] Int. Cl.³ .................................................. F16K 39/02
[52] U.S. Cl. ...................................... 251/282; 251/324; 251/57
[58] Field of Search ................ 251/282, 324, 325, 52; 60/562

[56] References Cited

U.S. PATENT DOCUMENTS

| | | | |
|---|---|---|---|
| 2,152,831 | 4/1939 | Williams | 251/324 |
| 2,732,172 | 1/1956 | Curran | 251/282 |
| 3,232,174 | 2/1966 | Grimmer | 91/170 |
| 3,249,122 | 5/1966 | Fleckenstein et al. | 251/324 |
| 3,329,221 | 7/1967 | Walker | 125/296 |
| 3,331,583 | 7/1967 | Baker | 251/63.5 |
| 3,385,561 | 5/1968 | Whalen | 251/282 |
| 3,428,297 | 2/1969 | Volpin | 251/355 |
| 3,499,287 | 3/1970 | Schrader | 60/562 |
| 3,563,508 | 2/1971 | DeLorenzo | 251/324 |
| 3,765,642 | 10/1973 | Nelson | 251/282 |
| 3,806,084 | 4/1974 | Seese | 251/325 |
| 3,892,384 | 7/1975 | Myers | 251/282 |
| 3,916,941 | 11/1975 | Usry | 251/282 |

FOREIGN PATENT DOCUMENTS

| | | | |
|---|---|---|---|
| 1810134 | 11/1968 | Fed. Rep. of Germany | 251/324 |
| 2417618 | 4/1973 | Fed. Rep. of Germany | 251/324 |

*Primary Examiner*—William R. Cline
*Assistant Examiner*—H. Jay Spiegel
*Attorney, Agent, or Firm*—Marvin B. Eickenroht; Jennings B. Thompson

[57] ABSTRACT

Flow control apparatus is disclosed in which a closure element is reciprocated between flow controlling positions by means of a stem which is substantially counterbalanced with respect to forces on the stem due to the pressure of the fluid being controlled as well as ambient pressure conditions.

6 Claims, 4 Drawing Figures

FLOW CONTROL APPARATUS

This invention relates generally to flow control apparatus; and, more particularly, to improvements in gate valves or chokes which have closure elements which are reciprocated between flow controlling positions by means of operators connected to stems extending sealably through an opening in the body.

The pressure of the fluid within the flowway of the body acts over the cross-sectional area of the stem which extends through a seal within the opening to create a force urging the stem in an outward direction. When this pressure is high, it may seriously interfere with the normal operation of the apparatus, whether the operator is of the mechanical type having a rotary nut for raising and lowering a threaded section of the stem, or whether it is of the fluid actuated type. In some cases, it requires that the operator have auxiliary equipment for counterbalancing at least part of the force, and even this is an unsatisfactory solution since the pressure of the fluid in the body flowway, and thus the force, may not be predictable.

Additional problems are encountered when apparatus of this type is installed in an environment, such as underwater, in which ambient pressure differs substantially from that within the body flowway. In the latter case, the hydrostatic pressure of the water may be so great as to create a significant force on the stem urging it in an inward direction. Although directed oppositely to the first described force, it nevertheless has the potential for causing similar problems in operating the gate valve or choke.

An object of this invention is to provide apparatus of this type in which fluid pressure within the body flowway has little or no effect on the normal operation of the closure element; and, more particularly, in which the ambient pressure in which the apparatus is installed has little or no effect thereon.

Another object of this invention is to provide such apparatus in which the stem and the body opening through which it extends are of such construction and so arranged as to create a force on the stem which substantially counterbalances the force urging it outwardly; and, more particularly, which also creates another force on the stem which substantially counterbalances the force due to ambient pressure conditions urging it inwardly.

A further object is to provide such apparatus which requires a minimum of modification of the stem and body of flow control apparatus of this type, and which is adapted for use with either fluid actuated or mechanical, rotary type operators.

These and other objects are accomplished, in accordance with the illustrated embodiment of the invention, by flow control apparatus of the type described in which the stem opening in the body is enlarged to form an annular space about the stem, and the stem has a piston thereon within the space. A first means is provided for sealing between the piston and enlarged portion of the body opening, a second means is provided for sealing between the stem opening and the stem intermediate the piston and exterior of the body to form with the first sealing means a first pressure chamber within the space and a third means is provided for sealing between the stem opening and the stem intermediate the piston and flowway to form with said first sealing means a second pressure chamber within said space. A means including a passageway is provided for connecting the flowway with the first pressure chamber in order to transmit the fluid pressure within the flowway to the effective pressure area of the piston within said first chamber, and a means including a port is provided for connecting the pressure second chamber with the exterior of the body in order to transmit ambient pressure to the effective pressure area of the piston within said second chamber. More particularly, the effective pressure area of the piston is the first pressure chamber is substantially equal to the cross-sectional area of the stem within the second sealing means, so as to substantially counterbalance the force of line pressure acting on the stem; and, in the preferred and illustrated embodiment of the invention, the effective pressure area of the piston within the second pressure chamber is substantially equal to the cross-sectional area of the stem within the third sealing means, so as to substantially counterbalance the effect of ambient pressure on the stem.

In the illustrated embodiment of the invention, the passageway is in the stem, a piston is sealably slidable in the passageway, and a fluid, which may be a lubricant, is disposed within the passageway and the first pressure chamber on one side of the piston to prevent contamination of the chamber and the seals defining same by line fluid.

Figure 1:
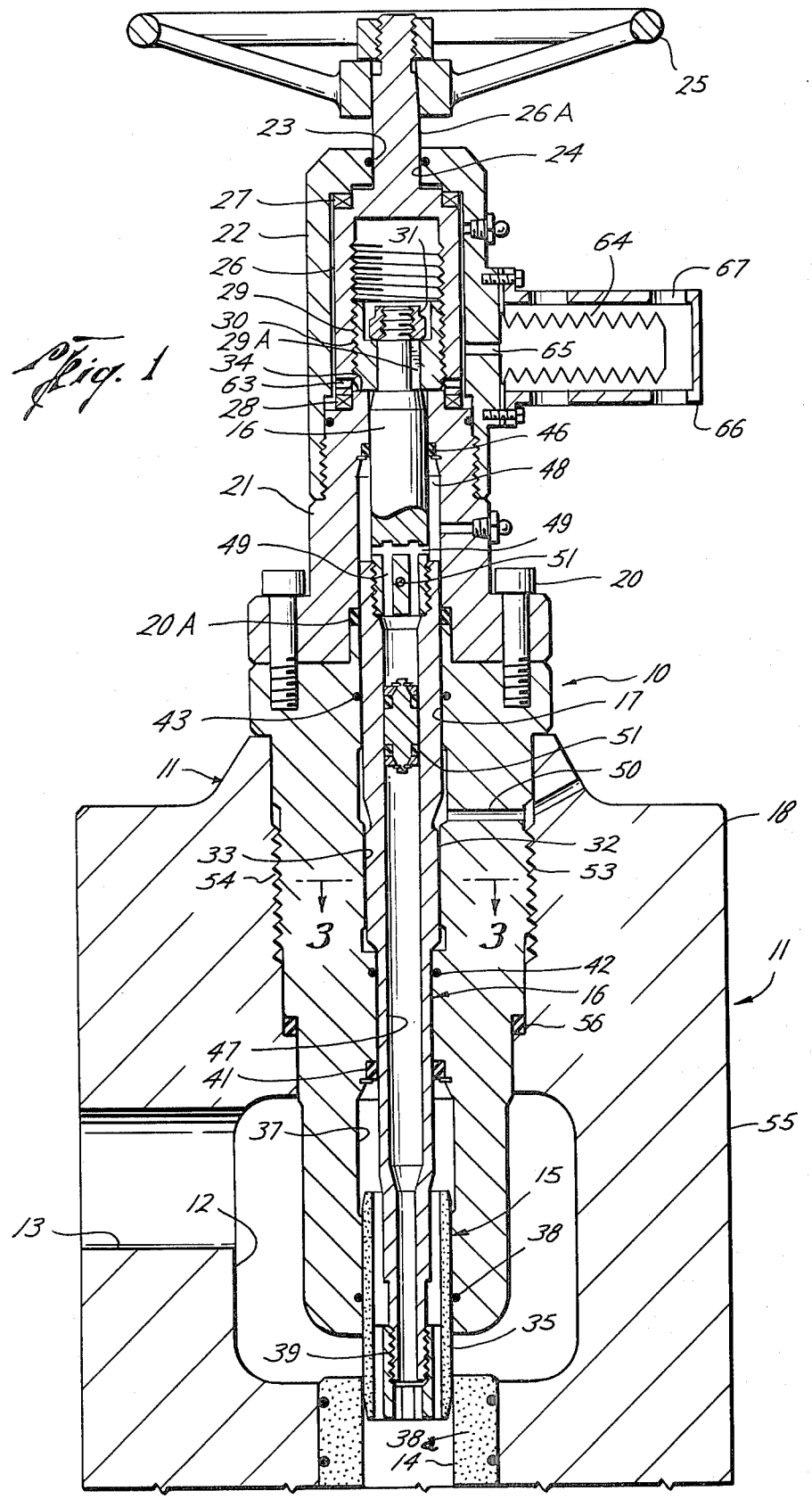
FIG. 1 is a longitudinal sectional view of a choke constructed in accordance with a preferred embodiment of the present invention, which is especially for use in an underwater environment, the closure element thereof being shown in a position substantially closing the outlet from the flowway of the body.
Figure 2:
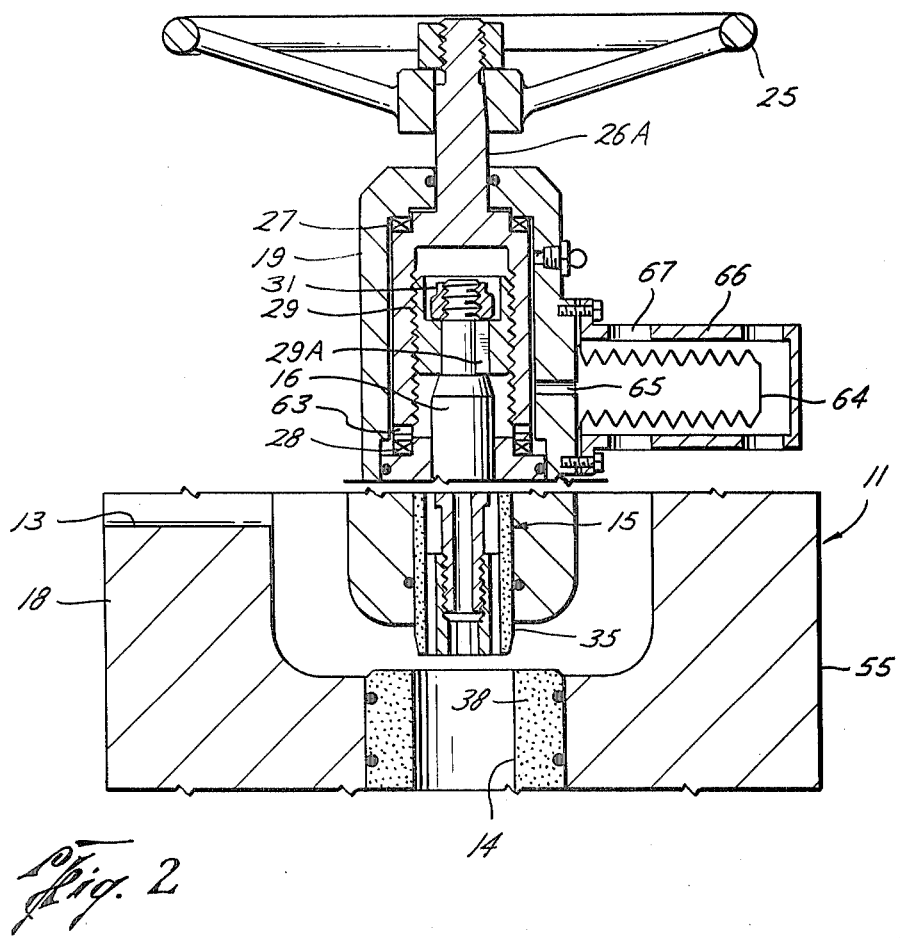
FIG. 2 is another longitudinal sectional view of the choke of FIG. 1, but with the portion thereof intermediate its uppermost and lowermost ends interrupted for purpose of clarity, and with the closure element raised to a position to permit substantial flow from the inlet through the outlet of the choke body.

With reference to the details of the above-described drawings, the choke, which is indicated in its entirety by reference character 10, comprises a body 11 having a flowway 12 therein, and an inlet 13 to the flowway and an outlet 14 from the flowway adapted for connection in a flowline. Flow from the inlet through the outlet is controlled by means of a closure element 15 carried on the lower end of a stem 16 for vertical reciprocation between the substantially closed position of FIG. 1 and the open position of FIG. 2. As shown in FIG. 1, in its substantially closed position, the lower end of the closure element moves downwardly into close fitting relation with a seat portion of the upper end of outlet 14, while, as shown in FIG. 2, in its open position, the lower end of the closure member is lifted above the seat.

Stem 16 is vertically reciprocal within an opening 17 in the body connecting flowway 12 with the exterior of the choke body. Body 11 through which opening 17 extends includes a main portion 18 in which the flowway, inlet and outlet are formed and a bonnet 21 connected by bolts 20 to the upper end of the main portion 18 and sealed with respect thereto by a seal ring 20A surrounding stem 16.

On operator 19 for reciprocating the stem to open and close the choke comprises a cap 22 threadedly connected to the upper end of bonnet 21, and a sleeve 26 rotatably mounted in the cap and having a stem 26A on its upper end which extends upwardly through a seal ring 23 carried within a hole 24 through the upper end of cap 22. Sleeve 26 is held against axial movement by means of bearings 27 and 28 on its opposite ends at the upper end of the cap and bonnet 21, respectively, and a hand wheel 25 is connected to the outer end of the upper portion of the stem of the sleeve for imparting rotation thereto.

Figure 3:
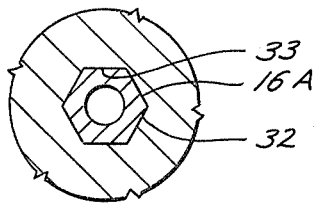
FIG. 3 is a cross-sectional view of the choke, as seen along broken lines 3—3 of FIG. 1.
Figure 4:
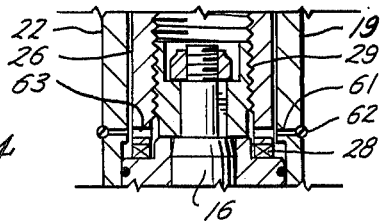
FIG. 4 is a longitudinally sectional view of a portion of the bonnet of a choke constructed in accordance with another embodiment of the invention, which is suited for use in above water environments.

A nut 29 threadedly connected at 30 to the inner surface of sleeve 26 is fixed to the upper end of stem 16 by means of spline 29A and nut 31. As shown in FIG. 3, stem 16 has a non-circular intermediate portion 32 which fits closely within a similar shaped portion 33 of opening 17. Consequently, upon rotation of hand wheel 25, nut 29 moves up and down to reciprocate the stem and closure element 15 carried thereby. In the substantially closed position of the closure member shown in FIG. 1, the lower end of nut 29 is seated upon a shoulder 34 on the upper end of bonnet 21. However, upon rotation of the hand wheel to raise nut 29, the closure element is lifted from its substantially closed to an open position, such as that shown in FIG. 2.

Closure member 15 comprises a sleeve 35 of hard, wear resistant material, such as sintered tungsten carbide, threaded to the lower end of stem 16. A bridge connects the collar to the sleeve to provide flowways therebetween to permit fluid to bypass the sleeve in moving into and out of an enlarged portion 37 of the lower end of stem opening 17. A seal ring 38 is carried about the lower end of opening 17 for slidably engaging the outer diameter of sleeve 35 to prevent washing out of its outer circumference by line fluid. As also shown, the lower end of sleeve 35 fits closely within the upper end of a replaceable insert 38A of similar, wear resistant material mounted in the upper end of outlet 14.

A reduced portion 40 of stem opening 17 intermediate the enlarged portion 37 and the non-circular portion 33 carries seal rings 41 and 42 for forming a seal with the portion of stem 16 intermediate its lower end and the noncircular portion 32 thereof. It is, of course, the cross-sectional area of the lower end of the stem which slides within these seal rings which is acted upon by line pressure to provide an upwardly directed force urging the stem, and thus closure element carried thereby, in an upward direction.

The enlarged portion 17A of opening 17 above the portion 33 thereof carries seal ring 43, which together with seal ring 20A, forms a seal between the enlarged opening portion and an enlarged portion 17B of stem 16 above the non-circular portion 32 thereof. The reduced portion in the upper end of opening 17 within bonnet 21 carries a seal ring 46 for sealing about a reduced portion of stem 16 beneath its connection to nut 29. As used in the claims, seal rings 20A and 43 provide a first sealing means, seal ring 46 provides a second sealing means, and seal rings 41 and 42 provide a third sealing means.

As shown, and is previously described, a passageway 47 is formed in stem 16 to connect at its lower end with the flowway 12 and at its upper end with a pressure chamber 48 within the upper portion of the annular space defined between seal ring 20A about the enlarged diameter portion 17A of opening 17 and seal ring 46 about the reduced diameter portion of the stem 16. More particularly, and as shown, the stem 16 is made up of threadedly connected upper and lower portions, and the upper end of passageway 47 comprises ports 49 formed in the lower end of the upper portion to connect with space 48. The threadedly connected portions of stem 16 are held in fixed relation to one another by means of a pin 51 extending through openings in them. A port 50 is formed in body 11 to connect body opening 17 intermediate seal rings 42 and 43 with the exterior of the body, and thus ambient pressure.

Thus, the enlarged portion of stem 16 forms a piston 16A which is slidable within seal rings 43 and 20A within the enlarged portion 17A of body opening 17, and seal rings 42 and 46 carried within the reduced portions 40 and 17B of body opening 17 seal about reduced portions of the stem at the upper end and lower end of the enlarged portion of the opening within which the piston reciprocates with the stem. The annular space about the stem within the enlarged portion of the opening includes an upper pressure chamber 48 between seal rings 46 and 20A, which receives an upwardly effective facing annular pressure area of the piston, and a lower pressure chamber 48A between seal rings 43 and 42 which receives a downwardly facing effective annular pressure area of the piston. Since passageway 47 in the stem connects with the upper pressure chamber, line pressure acts downwardly over the effective upwardly facing, annular area of the piston therein, and since port 50 connects the lower pressure chamber with the exterior of the valve by port 50, ambient pressure acts upwardly over the effective downward facing, annular area of the piston therein.

As previously described, the effective annular area of the piston within the upper pressure chamber is substantially equal to the cross-sectional area of the stem which extends through seal rings 41 and 42, so that the upwardly directed force on the stem due to line pressure is substantially balanced by an oppositely directed force within the upper pressure chamber. In a similar manner, the effective annular pressure area of the lower pressure chamber is substantially equal to the cross-sectional area of the stem which extends through seal ring 46. Thus, if the fluid pressure above the stem within cap 22 is approximately that of the ambient pressure, the inwardly directed force on the stem is substantially counterbalanced by an oppositely directed force due to ambient pressure admitted to the lower pressure chamber through port 50.

When choke 10 is used in an above water, or otherwise substantially atmosphere environment, the pressure within cap 22 will remain substantially atmospheric. However, to avoid a pressure lock within the cap as the stem moves up into it, a relief valve is provided in the form of ports 61 therein, and an O-ring 62 received within a semi-circularly shaped recess about the cap at the outer ends of the ports. Additional ports 63 are formed in sleeve 26 opposite ports 61 to fascilitate transfer of fluid between the annulus intermediate cap 19 and sleeve 26 and the interior of the sleeve beneath nut 29. Of course, in addition to avoiding a pressure lock, this relief valve will prevent a build up in pressure within the cap which substantially exceeds atmospheric.

When choke 10 is used in an underwater environment, a pressure lock within the cap is prevented by a bellows 64 mounted on a side of the cap to connect its interior with a hole 65 in the cap. The bellows is protected by a cylinder 66 bolted to the side of the cap about the bellows. Holes 67 in the cylinder fascilitate the admission of water to the bellows. As will be appreciated, the bellows also maintains pressure within the cap at substantially that of the water, so as to produce a downward force on the stem which substantially balances the upward force therein due to water admitted through vent 50.

In addition to its other functions in pressure balancing the stem, vent 50 may be useful in preventing seal ring 42 from being blown out due to excessive line pressure. Also, in the event line pressure leaks by ring 42, it will exhaust through vent 50 to avoid a pressure build up beneath bonnet 19.

A piston 51 is sealably slidable within passageway 47 beneath ports 49, and the portion of the passageway above the piston and the upper portion of the annular chamber within the body opening are filled with a suitable fluid, such as a lubricant, which will exclude, through the floating action of piston 51, line fluid from the chamber and the seals which define it. The piston may be of any suitable construction such as that shown, and the details of its construction are not important to the present invention.

For assembly purposes, the main portion 18 of the body includes an insert 53 which is threadedly connected at 54 to a bore in the upper end of the remainder 55 of the main body portion. As shown, the insert 53 carries the stem, closure element and valve bonnet so that all of these parts, including the seals between the stem opening and the stem, may be easily removed for repair or replacements separate from the remainder 55 of the main body portion. When seated within the remaining section 55 of the main body portion, insert 53 is sealed respect thereto by means of a seal ring 56.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is comtempleated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Flow control apparatus, comprising a body having a flowway therein with an inlet thereto and an outlet therefrom, a closure element reciprocable within the flowway between positions for controlling the flow of fluid from the inlet to the outlet, a stem on the closure element extending through an opening in the body, means connected to the stem for so reciprocating the closure element, said body opening having an enlarged portion to form an annular space about the stem, and said stem having a piston thereon within the space, first means sealing between the piston and enlarged portion of the body opening, second means sealing between the opening and the stem intermediate the piston and exterior of the body to form with said first sealing means a first pressure chamber within said space, and third means sealing between the opening and the stem intermediate the piston and flowway to form with said first sealing means a second pressure chamber within said space, means including a passageway connecting the flowway with the first pressure chamber in order to transmit the fluid pressure within the flowway to the effective pressure area of the piston within said first chamber, and means including a port connecting the second pressure chamber with the exterior of the body, in order to transmit ambient pressure to the effective pressure area of the piston within said second chamber, the effective pressure area of the piston within said first pressure chamber being substantially equal to the cross-sectional area of said stem within the third sealing means.

2. Apparatus of the character described in claim 1, wherein the portion of the stem which slides within the second sealing means is urged inwardly by the pressure of ambient fluid, and has a cross-sectional area substantially equal to the effective pressure area of the piston within the second pressure chamber.

3. Apparatus of the character described in claim 2, wherein said passageway is in the stem.

4. Apparatus of the character described in claim 2, including a piston sealably slidable in the passageway, and a fluid within the passageway and first pressure chamber on one side of the piston.

5. Apparatus of the character described in claim 1, wherein said passageway is in the stem.

6. Apparatus of the character described in claim 5, including a piston sealably slidable in the passageway, and a fluid within the passageway and first pressure chamber on one side of the piston.

* * * * *